United States Patent [19]

Schlichting

[11] 4,116,174

[45] Sep. 26, 1978

[54] SPARK TIMING COMPUTER

[76] Inventor: Kenneth J. Schlichting, 13651 N. Mindora Ave., Sylmar, Calif. 91342

[21] Appl. No.: 699,057

[22] Filed: Jun. 23, 1976

[51] Int. Cl.² .............................. F02P 5/04; F02P 5/06
[52] U.S. Cl. ................................................. 123/117 R
[58] Field of Search ..................................... 123/117 R

[56] References Cited

U.S. PATENT DOCUMENTS

| 3,885,720 | 5/1975 | Brennan | 123/117 R |
| 3,888,220 | 6/1975 | Bigalke et al. | 123/117 R |
| 3,897,766 | 8/1975 | Pratt, Jr. et al. | 123/117 R |
| 3,910,243 | 10/1975 | Gau et al. | 123/117 R |

Primary Examiner—Samuel W. Engle
Assistant Examiner—Thomas H. Webb
Attorney, Agent, or Firm—W. Edward Johansen

[57] ABSTRACT

The invention is a spark timing computer which includes a resetting device for forming a start pulse and a stop pulse which is electrically coupled to the reference angle detecting device, an integrator which is electrically coupled to a reference voltage which is reset by either a stop pulse or a start pulse from the resetting device, a peak detecting device for detecting and holding the peak amplitude of the integrator and being reset by a start pulse from the resetting device, a scaling device for scaling the peak amplitude of the peak detecting device which is electrically coupled to the peak detecting device, a comparing device for comparing the scaled peak amplitude of the peak detecting device with the output signal of the integrator and a triggering device for forming a spark trigger in response to a signal from the comparing device and for sending the spark trigger to a spark generator. The spark timing computer also includes devices for varying the stop pulse width and the start pulse width which are electrically coupled to the resetting device. The spark timing computer further includes a triggering device for providing a spark trigger in response to the start pulse of the resetting device and an inhibiting device for inhibiting the triggering device in response to a signal from the peak amplitude detecting device indicating a particular rotational speed of the engine.

5 Claims, 5 Drawing Figures

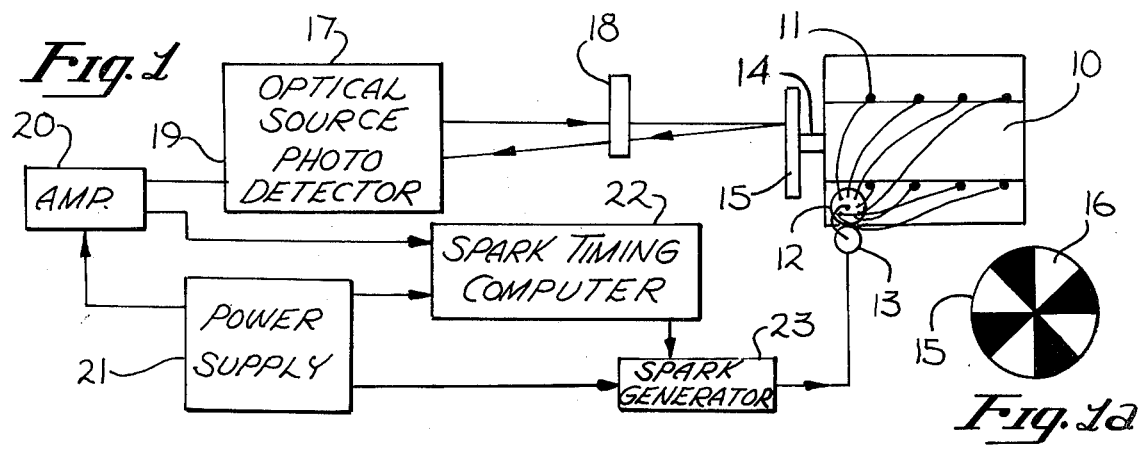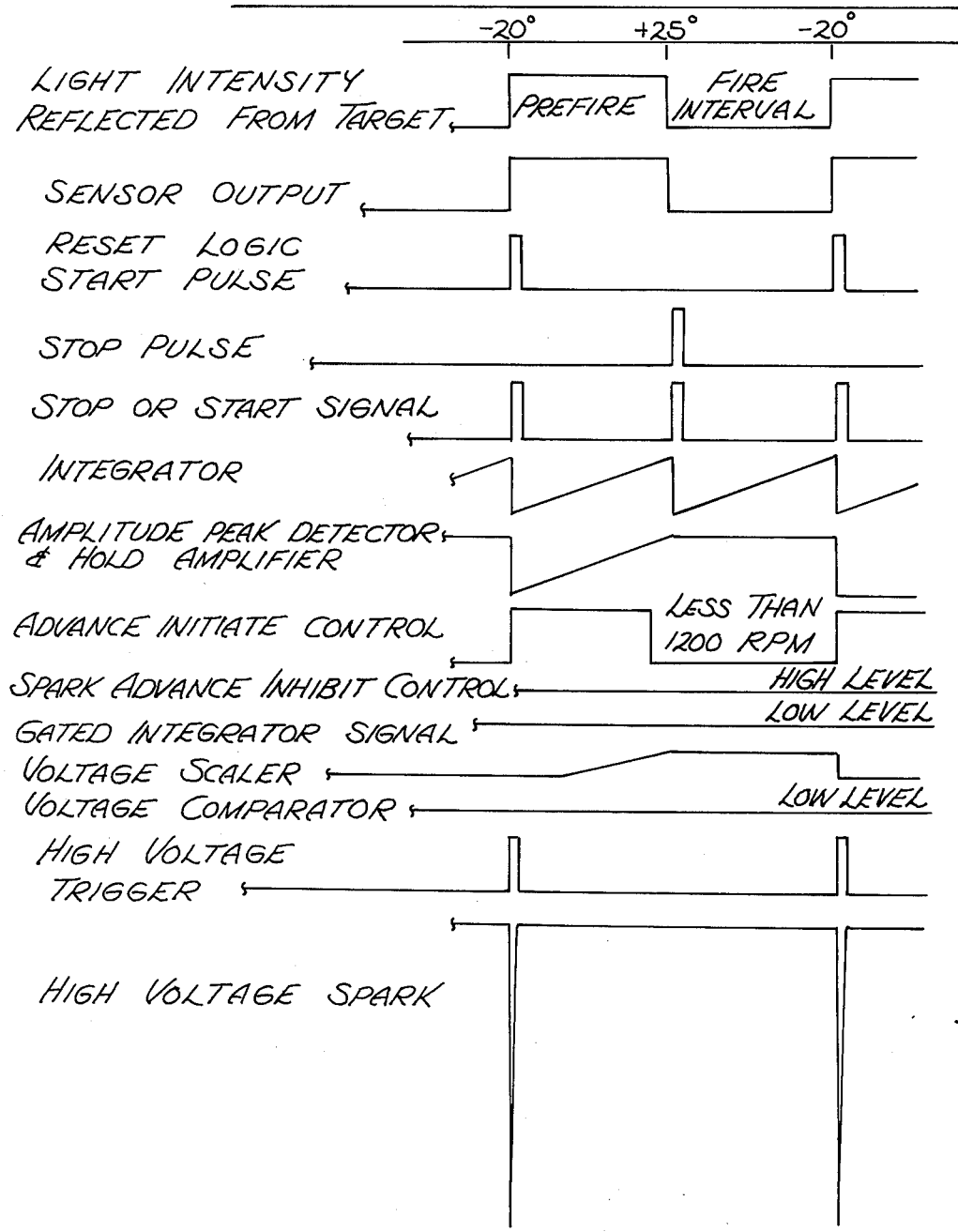

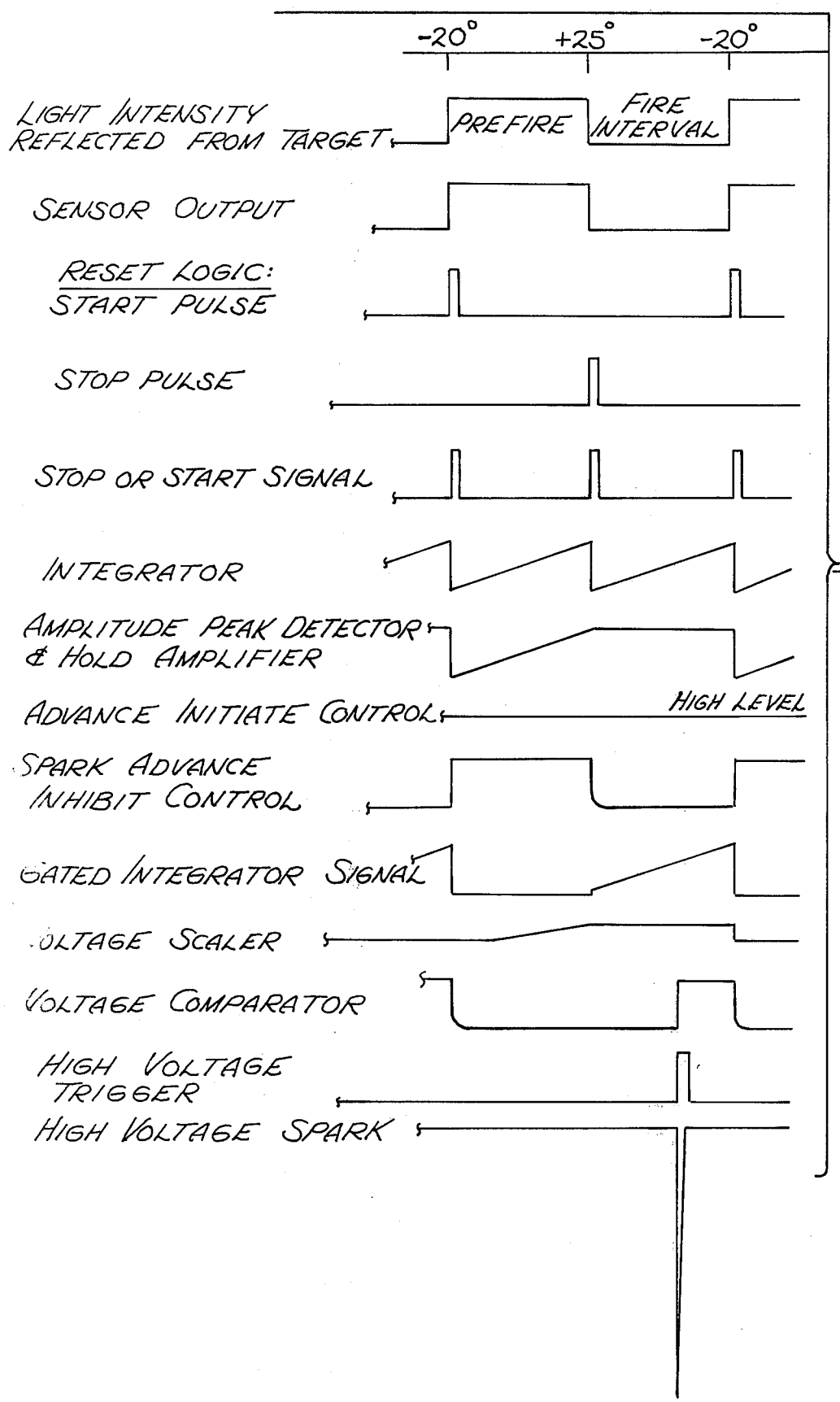

SPARK TIMING COMPUTER

BACKGROUND OF THE INVENTION

1. Field of the Invention

The present invention relates particularly to a control system for controlling the ignition timing of a spark-ignition internal combustion engine, having a crankshaft, and more particularly to an improved electronic ignition control circuit for advancing or retarding the ignition timing in response to the rotational speed of the crankshaft.

2. Description of the Prior Art

The conventional ignition timing control systems of the kind comprise a centrifugal spark advance mechanism for adjusting the ignition timing of an engine according to the number of revolutions of the engine and a vacuum control mechanism adapted to advance or retard the ignition timing according to the engine intake manifold vacuum. This is based on the concept that primarily the ignition of an engine can be accurately timed to a satisfactory degree according to two factors: the engine revolutions and engine intake manifold vacuum.

With the conventional ignition timing control systems described above, a spark advance characteristic curve corresponding to the engine rpm is obtained by means of the centrifugal spark advance mechanism and then a parallel displacement of this spark advance characteristic curve is effected by the vacuum control mechanism according to the engine intake manifold vacuum so as to obtain a desired ignition timing.

Furthermore, when the conventional ignition timing control system is used in race boats, race cars and other applications of the internal combustion engine it utilizes a distributor, a magneto or a magnetic or optical device to monitor the position of the crankshaft directly. The system that uses the distributor for the timing function is capable of varying the amount of timing advance and does so by a mechanical device involving the use of a transducer, such as an electrical transducer, a mechanical transducer or a vacuum transducer. None of these transducers provides to a high degree accurate control of the advance function; and none of these transducers provide flexibility in the type of advance characteristics that may be obtained.

Presently, timing systems that employ computers to modify the advance characteristics of the ignition timing are made less accurate by the fact that they still use transducers to modify the spark timing function. A timing system utilizing a distributor to obtain its basic timing function also utilizes mechanical points, magnetic proximity detectors or optical pick-off devices. This timing system employs a mechanical device to vary the spark timing. There is a disadvantage in using the distributor to obtain the basic timing function in that there is a significant error between the position of the distributor shaft and the position of the crankshaft. The distributor's position error is caused by the slack between the crankshaft, camshaft and the distributor shaft. Since the position of the crankshaft is the important factor in timing the spark for optimum horsepower, optimum efficiency, minimum exhaust emissions or whatever engine characteristic is most desirable for the particular application for which it is being used it is desirable to eliminate or reduce the distributor's position error relative to the crankshaft.

A small number of timing systems presently in use actually "time" directly off the crankshaft, using it as a basic timing reference device by using a magnetic or an optical device. While this eliminates the error in the basic timing function, it renders the normal advance-modification techniques useless.

There are also mechanical timing systems that employ a centrifugal device and/or a vacuum control device, but these systems are cumbersome and exhibit poor accuracy, thereby defeating any advantage that may be gained by employing the crankshaft itself as the basic timing reference. Furthermore, these timing systems offer very little flexibility in the spark advance characteristics that may be obtained.

There are some devices in the prior art that obtain a spark timing which is accurate to a high degree and that provide flexibility in the spark advance characteristics that may be obtained. For example, U.S. Pat. No. 3,871,342 entitled Electronic Ignition Timing Control Circuit For Internal Combustion Engine, issued to Hiroshi Fujinami and Katuyuki Takagi on Mar. 18, 1975 teaches an electronic timing control circuit that uses a digital device primarily in its computing circuits to provide stability against variations in both voltages of the power supply of the control circuit and the ambient temperature. This control circuit is too cumbersome to provide the most effective and reliable device to achieve an optimum timing function. Furthermore, this control circuit requires, in addition to reference angular detecting device, a separate revolution detecting device.

U.S. Pat. No. 3,768,451, entitled Ignition Timing Control System, issued to Hisaji Okamoto on Oct. 30, 1973, teaches an ignition timing control system having a set of ignition times present to meet the ignition timing requirement of an engine operating under various satisfactory operating conditions, whereby an ignition time which meets the ignition timing requirement of the engine at each time is selected from the set of ignition times to be applied to the engine according to the engine revolutions, engine intake manifold vacuum, and temperature of the engine cooling water. This ignition control system is too cumbersome to be practical.

U.S. Pat. No. 3,853,103, entitled Ignition Timing Control System for Internal Combustion Engine Ignition Systems, issued to Joseph Wahl and Wolf Wessel on Dec. 10, 1974, teaches an ignition timing control system having a pulse generator which provides a pulse train representative of angular position of the engine crankshaft, and a marker pulse, at a predetermined angular crankshaft position. A counter is connected to the train of pulses to start counting upon occurrence of the marker pulses. A digital/analog converter converts the binary count numbers into an analog signal, which is compared with engine operation signals representative of spark advance or retardation, the comparator providing an output when the count derived from the counter and the operation parameter control signals match. The engine operation control signal may be a composite of signals commanding spark advance or spark retardation, such as speed signals, load signals or other operating parameter signals, applied to the comparator as varying voltages or currents. This design is too cumbersome to be practical.

SUMMARY OF THE INVENTION

In view of the factors and conditions characteristic of the prior art it is a primary object of the present invention to provide an improved ignition timing control system which can be incorporated on an engine without any material modification of the engine other than mounting a sensor to monitor the position of the crankshaft of the engine and a target mounted to the crankshaft of the engine.

It is another object of the present invention to provide an improved ignition control system which can provide a change of ignition timing by an operator performing a few simple adjustments to the control circuitry of the ignition control system, such as adjusting one of the potentiometers.

It is still another object of the present invention to provide an improved ignition control system which can provide ignition timing characteristics which are independent of environmental conditions and independent of such internal conditions as engine temperature, voltages of the power supply, and tolerances of resistors and other components used in the control circuit.

It is yet another object of the present invention to provide an improved ignition control system that is flexible in providing timing characteristics with few components and in still being maintained to a high degree of timing accuracy.

It is yet still another object of the present invention to provide an improved ignition control system that achieves the desired timing characteristics without using moving parts within the control system, yet with still using the distributor rotor as a spark sequencer.

In accordance with an embodiment of the present invention a spark timing computer, for use in a system for advancing or retarding the spark timing of an engine having a set of spark plugs, a spark generator for generating a pulse in response to a spark trigger, a coil for generating a spark in response to the pulse, a distributor for distributing the spark to each of the spark plugs, with the engine also having a crankshaft and a reference angle detecting device coupled to the crankshaft and having a square wave output, has been described. The spark timing computer includes a resetting device for forming a start pulse and a stop pulse which is electrically coupled to the reference angle detecting device, and integrator which is electrically coupled to a voltage reference and which is reset by either a stop pulse or a start pulse from the resetting device, a peak detecting device which is reset by the resetting device for detecting and holding the peak amplitude of the peak detecting device, a scaling device for scaling the peak amplitude of the peak detecting device which is electrically coupled to the peak detecting device, a comparing device for comparing the scaled peak amplitude of the peak detecting device with the output signal of the integrator and a triggering device for forming a spark trigger in response to a signal from the comparing device and for sending the spark trigger to the spark generator. The spark timing computer also includes devices for varying the stop pulse width and the start pulse width which are electrically coupled to the resetting device. The spark timing computer further includes a triggering device for providing a spark trigger in response to the start pulse of the resetting device and an inhibiting device for inhibiting the triggering device in response to a signal from the peak detecting device indicating a particular rotational speed of the engine. The spark timing computer has a set of devices for introducing steps in the advance and retard characteristics of the spark timing. In order to control the width of the spark trigger the spark timing computer uses a monostable multivibrator which is electrically coupled to the comparing device so as to provide a consistent spark trigger characteristic.

The features of the present invention which are believed to be novel are set forth with particularlity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a schematic diagram of an engine with a spark timing computer which is constructed in accordance with the principles of the present invention.

FIG. 1a is a front plan view of a target used in conjunction with the engine and the spark timing computer of FIG. 1.

FIG. 3 is a timing diagram for the spark timing computer of FIG. 2 when the engine is below 1200 revolutions per minute.

FIG. 4 is a timing diagram for the spark timing computer of FIG. 2 when the engine is above 1200 revolutions per minute.

DESCRIPTION OF THE PREFERRED EMBODIMENT

Figure 2:
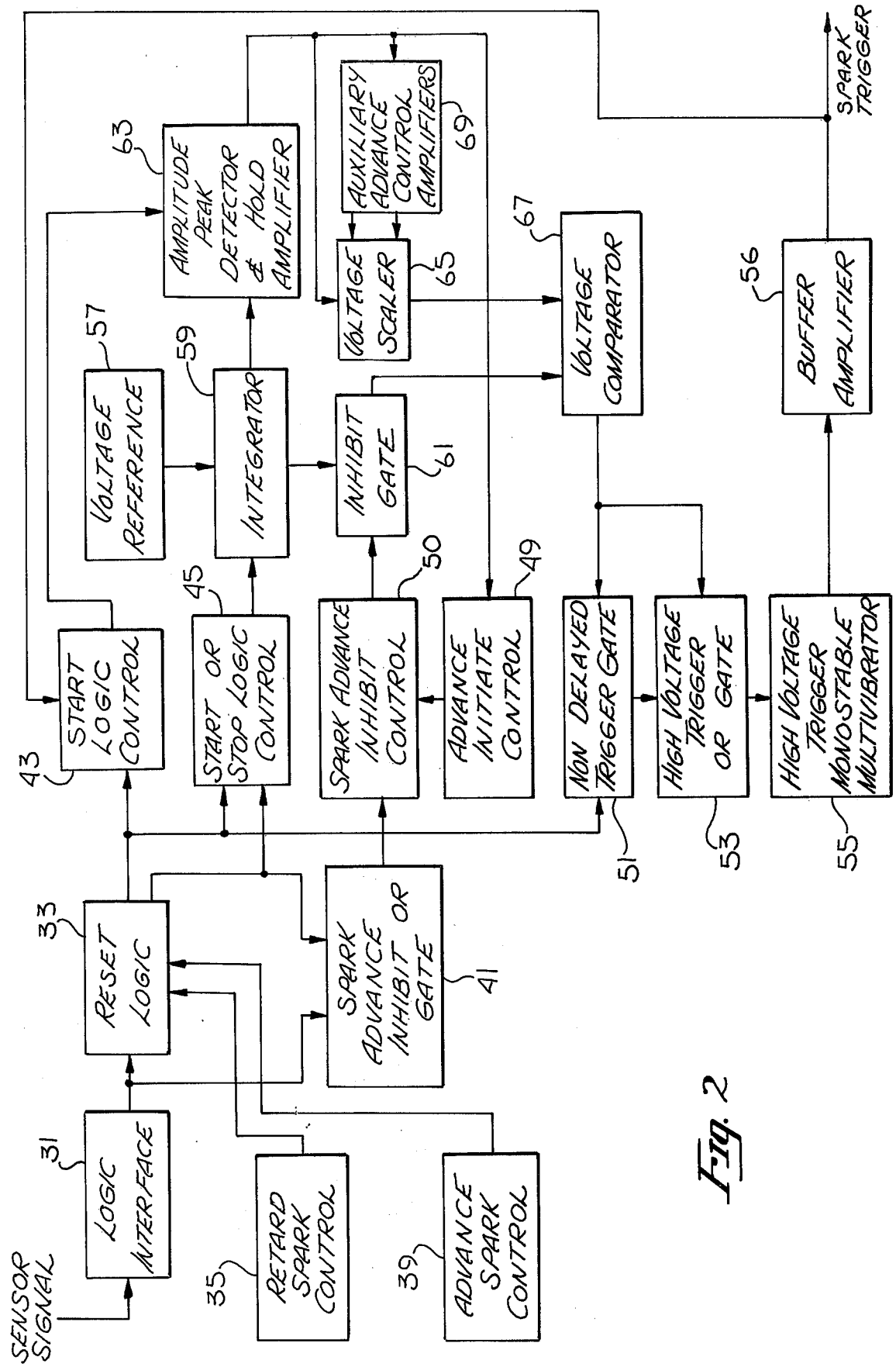
FIG. 2 is a schematic diagram of the spark timing computer of FIG. 1.

The present invention can best be understood by referring to a description of its preferred embodiment shown in FIG. 1. The present invention is used in conjunction with a spark-ignition internal combustion engine 10 having a set of eight spark plugs 11, a distributor 12 and a coil 13. The engine 10 also has a crankshaft 14 on which a flywheel 15 is mounted. Referring briefly to FIG. 1a, the flywheel 15 has reflective surface areas on its face which function as a targer 16. In the preferred embodiment the target 16 has four reflective and four non-reflective surface areas marked on it. Each surface area has a 45° arc and is alternately positioned. The reflective areas are diffusing surfaces in order to spread the reflected light thereby eliminating the necessity for precise optical alignment. For example, a satin-finish aluminum surface functions very well. The target 16 is indexed in such a manner that the reflectance (as seen by a photo-detector) changes at the particular spark timing which is desired during conditions of engine starting. In the preferred embodiment the reflectance was arbitrarily chosen to change from a low value to a high value at this point. During starting conditions the spark occurs at the time the reflectance changes from low to high. This technique ensures that the timing is correct regardless of how erratic or how slow the engine cranks during starting conditions.

An optical source 17, which is generally a galliumarsenide infra-red crystal light-emitting diode which puts out a steady light intensity, is aimed at the target 16 through a lens 18 which focuses the light from the optical source 17 upon the target 16. A photo-detector 19 is aligned with the reflected light from the reflective surface areas of the target 16 and converts the reflected light to an electrical sensor output. An electronic pre-amplifier 20 amplifies this electrical signal, whose magnitude is proportional to the intensity of the reflected light, in order for the electrical sensor output to be carried through a cable to a computer without interference from external noise sources. A power supply 21 provides electrical power to the electronic preamplifier 20.

The present invention is a spark timing computer 22. It is electrically coupled to the power supply 21 and receives the electrical sensor output from the electronic preamplifier 20. A spark generator 23 is electrically coupled to the spark timing computer 22 and provides a pulse to the coil 13. The spark generator 23 includes a high efficiency ignition coil and a capacitive discharge ignition device which uses a darlington transistor, instead of a silicon controlled rectifier, to discharge the capacitor of the device.

Referring now to FIG. 2, the spark timing computer 22 includes a logic interface 31 which is electrically coupled to the preamplifier 20 from which it receives the sensor signal. The logic interface 31 converts the sensor signal, which has an uncertain amplitude, to a signal suitable to trigger standard-logic integrated circuits. At the same time it processes the sensor signal through circuitry which introduces a noise threshhold and electrical hystereses in order to ensure that any noise present on the signal will not cause false triggering irrespective of the position of the target 16. Otherwise this false triggering could occur if the engine had its ignition on with the target 16 motionless at a troublesome position.

Referring to both FIG. 3 and FIG. 4, the outputs of the preamplifier 20 and logic interface 31 are essentially square waves.

In the spark timing computer 22, a reset logic device 33 receives the square wave from the logic interface 31. The square wave triggers two monostable multivibrators within the reset logic device 33, one of which triggers on the positive-going edge, and is designated start pulse and the other of which triggers on the negative going edge and is designated stop pulse.

The spark timing computer 22 also includes a retard spark control 35 which is electrically coupled to the reset logic device 33 and which lengthens the stop pulse to increase the retard rate and an advance spark control 39 which is electrically coupled to the reset logic device 33 and which lengthens the start pulse to increase the advance rate. The spark timing computer 22 further includes a spark advance inhibit "or" gate 41 which is electrically coupled to the logic interface 31 from which it receives the square wave and to the reset logic device 33 from which it receives a stop pulse. The spark timing computer 22 still further includes a start logic control 43 which is electrically coupled to the reset logic device 33 from which it receives a start pulse. Also included in the spark timing computer 22 is a start or stop logic control 45 which receives both the start pulse and the stop pulse from the reset logic device 33 and sends a reset pulse. An advance initiate control 49 receives a revolutions per minute signal and initiates an advance when the revolutions per minute exceed 1200. A spark advance inhibit control 50 is electrically coupled to the advance initiate control 49 and to the spark advance inhibit "or" gate 41.

Still referring to FIG. 2 the spark timing computer 22 has a non-delayed trigger gate 51 which is electrically coupled to the reset logic device 33 from which it receives a start pulse to provide the ined to the voltage reference 57 and which is also electrically coupled to the start or stop logic control 45 from which it receives the reset pulse. The spark timing computer 22 also has an inhibit gate 61 which is electrically coupled to the output of the integrator 59. The output of both the integrator 59 and the inhibit gate 61 are shown in FIG. 3 for the engine 10 when it is turning less than 1200 revolutions per minute and in FIG. 4 for the engine 10 when it is turning more than 1200 revolutions per minute. The outputs of the integrator 59 and the inhibit gate 61 are designated INTEGRATOR and GATED INTEGRATOR SIGNAL, respectively. It can be seen that the integrator 59 is reset by either the stop pulse or the start pulse.

In the spark timing computer 22 an amplitude peak detector and hold amplifier 63 is electrically coupled to the integrator 59 from which it receives the INTEGRATOR signal shown in FIG. 3 and FIG. 4. The output of the amplitude peak detector and hold amplifier 63 is shown in FIG. 3 and FIG. 4 and is designated as AMPLITUDE PEAK DETECTOR & HOLD AMPLIFIER in both figures. The amplitude peak detector and hold amplifier 63 receives a reset pulse from the start logic control 43 and sends a revolutions per minute signal to the advance initiate control 49. If the engine is turning less than 1200 revolutions per minute, then the advance initiate controls 49 sends a rectangular wave, designated ADVANCE INITIATE CONTROL in FIG. 3 to the spark advance inhibit control 50. If the engine is turning more than 1200 revolutions per minute, then the advance initiate control 49 sends a high signal to the advance inhibit control 50.

Still referring to FIG. 2, the spark timing computer 22 has a voltage scaler 65 which is electrically coupled to the amplitude peak detector and hold amplifier 63 from which it receives the revolutions per minute signal. The voltage scaler 65 is also electrically coupled to a voltage comparator 67 to which it sends a scaled revolutions per minute signal that is designated VOLTAGE SCALER in FIG. 3 and FIG. 4. The voltage comparator 67 is electrically coupled to the inhibit gate 61 from which it receives the GATED INTEGRATOR SIGNAL and also to the non-delayed trigger gate 51 to which it sends an advance pulse thereby closing the non-delayed trigger gate 51. The spark timing computer 22 also has a set of auxiliary advance control amplifiers 69 which are electrically coupled to the amplitude peak detector and hold amplifier 63 and to the voltage scaler 65.

In operation the spark timing computer 22 is best understood by referring first to FIG. 3 which is a series of timing diagrams for the engine 10 when it is turning less than 1200 revolutions per minute and then to FIG. 4 which is a series of timing diagrams for the engine 10 when it is turning more than 1200 revolutions per minute. The output of the photo detector 19 is a square wave which goes positive at 20° before top dead center of a piston (−20) and goes negative at +25°, each cycle running from −20° to +70° is repeated as the crankshaft 14 makes a one-quarter of a revolution. The output of the preamplifier 20 is also a square wave.

The logic interface 31 sends the square wave to the reset logic device 33 which provides both a start pulse at −20° and a stop pulse at +25°. The start or stop logic control 45 provides a reset pulse, which is actually the combination of the start pulse and the stop pulse, and sends it to the integrator 59. The start pulse alone resets the amplitude peak detector and hold amplifier 63. The output of the integrator 59 is a sawtooth wave and the output of the amplitude peak detector and hold amplifier 63 is a series of ramps and level portions which begin at −20° and end at +70° of each cycle.

When the engine 10 is turning less than 1200 revolutions per minute the advance initiate control 49 sends a rectangular wave in phase with the output of the logic interface 31 to the spark advance inhibit control 50 thereby activating the spark advance inhibit control 50 and closing the inhibit gate 61 so that there is no GATED INTEGRATOR SIGNAL being sent to the voltage comparator 67. Since there is no GATED INTEGRATOR SIGNAL sent to the voltage comparator 67, it does not send an advance pulse to the non-delayed trigger 51 thereby leaving this gate open so that the start pulse serves as the initial timing trigger to the non-delayed trigger gate 51 and triggers the high voltage trigger multivibrator 55 through the high voltage trigger "or" gate 53. The high voltage trigger monostable multivibrator 55 sends its output through a buffer amplifier 56 and the output of the buffer amplifier 56 is the spark trigger that is transmitted to the spark generator 23. The spark trigger occurs at 20° before top dead center of a piston for all engine speeds below 1200 revolutions per minute.

When the engine 10 is turning more than 1200 revolutions per minute the advance control 49 sends a high signal to the spark advance inhibit control 50 which has an output that is in phase with the square wave output of the logic interface 31. The inhibit gate 61 closes whenever the output of the spark advance inhibit control 50 is high and opens whenever the same output is low and operates in conjunction with the output of the integrator 59 to provide a GATED INTEGRATOR SIGNAL. The INTREGRATOR signal is inhibited during the prefire interval in order to prevent false triggering. The amplitude of the INTEGRATOR signal is determined by the rotational speed of the engine's 10 crankshaft 14 and varies linearly therewith. The voltage scaler 65 scales the AMPLITUDE PEAK DETECTOR & HOLD AMPLIFIER signal in half to provide a VOLTAGE SCALER signal and sends this signal to the voltage comparator 67 in which it is compared to the GATED INTEGRATOR SIGNAL. When the GATED INTEGRATOR SIGNAL exceeds the VOLTAGE SCALER signal it closes the non-delayed trigger gate 51 and triggers the high voltage trigger monostable multivibrator 55 through the high voltage trigger "or" gate 53. When the engine 10 is turning more than 1200 revolutions per minute the advance is initially set at 42½° before top dead center of a piston (−42½°). From the 42½° advance the spark timing computer 22 alters the advance in the following manner. The revolutions per minute signal, RPMS, from the amplitude peak detector and hold amplifier 63 is sent to the voltage scaler 65 which scales the RPMS in half as can be readily seen in FIG. 4 where the output of the voltage scaler 65 is designated VOLTAGE SCALER. The VOLTAGE SCALER signal and the GATED INTEGRATOR SIGNAL are compared in the voltage comparator 67 which sends a signal whenever the GATED INTEGRATOR SIGNAL exceeds the VOLTAGE SCALER signal to the non-delayed trigger gate 51 and the high voltage trigger "or" gate 53. Since the VOLTAGE SCALER signal is one half the peak amplitude of the GATED INTEGRATOR SIGNAL, it takes the GATED INTEGRATOR SIGNAL only one half of the 45° rotation to reach the amplitude level of the VOLTAGE SCALER signal, i.e. 22½°. Therefore, the advance is now (22½° + 20°) = 42½°.

The auxiliary advance control amplifiers 69 operate in the spark timing computer 22 by changing the scaling factor within the voltage scaler 65. The auxiliary advance control amplifiers 69 provide the spark timing computer 22 with the capability of not only varying the advance or retard characteristic in a continuous variation, but also introducing steps in the variation of the advance or retard characteristic. The advance can also be varied by lengthening the STOP PULSE or the START PULSE. Lengthening the STOP PULSE will cause the integrator 59 to start later thereby retarding the spark. This effect is more pronounced as the engine turns faster because the integrator 59 starts later in its timing cycle as the engine 10 speeds up. Lengthening the START PULSE will prevent the RPMS from reaching its normal level and allow the coincidence between the GATED INTEGRATOR SIGNAL and the VOLTAGE SCALER signal to occur sooner thereby advancing the spark timing. Therefore the spark timing computer 22 can either increase or decrease spark timing in relation to the revolutions per minute signal.

The present invention requires only a reference angle detecting device, because it uses an analog computer which, unlike a digital computer, is able to derive the revolutions per minute information from the reference angle as it varies with time. Furthermore, although it is an analog computer, its design is such that is also provides stability against variations in both voltages from the power supply and the ambient temperature.

The primary advantage of the spark timing computer is that its use improves the performance of an engine. It is not only a reliable computer for spark timing, but also a versatile computer. The spark timing computer may be used with any reference angle detecting devices such as optical source/photo-detector arrangements as in the preferred embodiment, mechanical devices, magnetic devices, and electrical devices. Furthermore, the voltage scaler and reset pulses may be set for any particular advance or retard characteristic desired.

From the foregoing it can be seen that a spark timing computer has been described for use in controlling the ignition timing of a spark-ignition internal combustion engine.

It should be noted that the schematic drawing of the system for advancing or retarding the spark timing is not drawn to scale and that distances of and between the figures are not to be considered significant.

What is claimed is:

1. A spark timing computer for use in combination with a system for advancing or retarding the spark timing of an engine having a set of spark plugs, a spark generator for generating a pulse in response to a spark trigger, a coil for generating a spark in response to the pulse, a distributor for distributing the spark to each of the spark plugs, with the engine also having a crankshaft and a reference angle detecting device coupled to the crankshaft and having a squarewave output, said spark timing computer comprising:
    a. resetting means for forming a start pulse and a stop pulse electrically coupled to the reference angle detecting device;
    b. an integrator electrically coupled to a voltage reference and reset by either the start pulse or the stop pulse from said resetting means;
    c. peak detecting means for detecting and holding the peak amplitude of said integrator and reset by the start pulse;

d. scaling means for scaling the peak amplitude of said peak detecting means electrically coupled to said peak detecting means;

e. comparing means for comparing the scaled peak amplitude of said peak detecting means with the output of said integrator; and f. triggering means for forming a spark trigger in response to a signal from said comparing means and for sending the spark trigger to the spark generator.

2. A spark timing computer according to claim 1 wherein said spark timing computer also comprises:

a. means for varying the stop pulse width electrically coupled to said resetting means; and b. means for varying the start pulse width electrically coupled to said resetting means.

3. A spark timing computer as in claim 2 also comprising:

a. triggering means electrically coupled to said resetting means, said triggering means providing a spark trigger in response to the start pulse output of the resetting means; and b. inhibiting means for inhibiting said triggering means in response to a signal from said peak detecting means indicating a particular rotational speed of the engine.

4. A spark timing computer according to claim 3 wherein said spark timing computer still further comprises means for introducing steps in the advance or retard characteristics of the spark timing.

5. A spark timing computer according to claim 4 wherein said spark timing computer also comprises a high voltage trigger monostable multivibrator electrically coupled to said comparing means so as to provide a consistent spark trigger characteristic.

* * * * *